United States Patent [19]

Masclet

[11] Patent Number: 4,905,644
[45] Date of Patent: Mar. 6, 1990

[54] SELF CLEANING BY-PASS FILTRATION ARRANGEMENT

[75] Inventor: Dominique Y. G. Masclet, Creteil, France

[73] Assignee: Societe Nationale d'Etude et de Construction de Moteurs d'Aviation "S.N.E.C.M.A", Paris, France

[21] Appl. No.: 335,941

[22] Filed: Apr. 10, 1989

[30] Foreign Application Priority Data

Apr. 13, 1988 [FR] France .................. 88 04861

[51] Int. Cl.⁴ .............................................. F01M 1/00
[52] U.S. Cl. ................................ 123/196 A; 210/132
[58] Field of Search ............... 123/196 A; 184/6.24; 210/434, 132, 131, 108, 253, 254

[56] References Cited

U.S. PATENT DOCUMENTS

| | | | |
|---|---|---|---|
| 2,425,700 | 8/1947 | Le Clair | 184/6 |
| 3,120,490 | 2/1964 | Samson | 210/132 |
| 3,432,005 | 3/1969 | Gates | 123/196 A |
| 3,485,369 | 12/1969 | Voorheis | 210/132 |
| 3,771,624 | 11/1973 | Forgeron | 123/196 A |
| 4,512,299 | 4/1985 | Egan et al. | 123/196 A |
| 4,615,800 | 10/1986 | Stifelman et al. | 210/132 |

FOREIGN PATENT DOCUMENTS 891916 3/1944 France .
820878 9/1959 United Kingdom .

Primary Examiner—E. Rollins Cross
Attorney, Agent, or Firm—Oblon, Spivak, McClelland, Maier & Neustadt

[57] ABSTRACT

In a lubrication circuit for a turbo-engine in which the main filter is provided with a by-pass circuit including a by-pass valve and a relief filter, a return circuit is connected between the by-pass circuit, downstream of the by-pass valve, and a point situated upstream of the supply pump of the lubrication circuit, the return circuit including throttling means. During normal operation of the lubrication circuit, a portion of the clean fluid from the main filter is diverted to the throttled return circuit, thus flowing through the relief filter counter to the direction of fluid flow therethrough when the main filter is clogged and the by-pass valve is open, thereby effecting automatic cleaning of the relief filter.

3 Claims, 1 Drawing Sheet

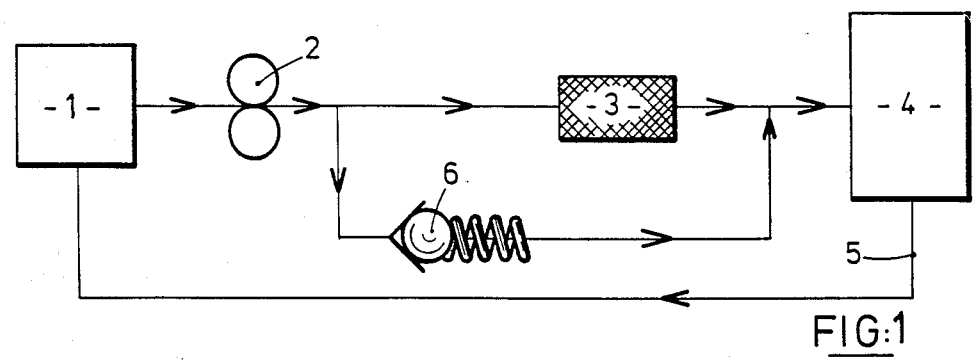
FIG:1
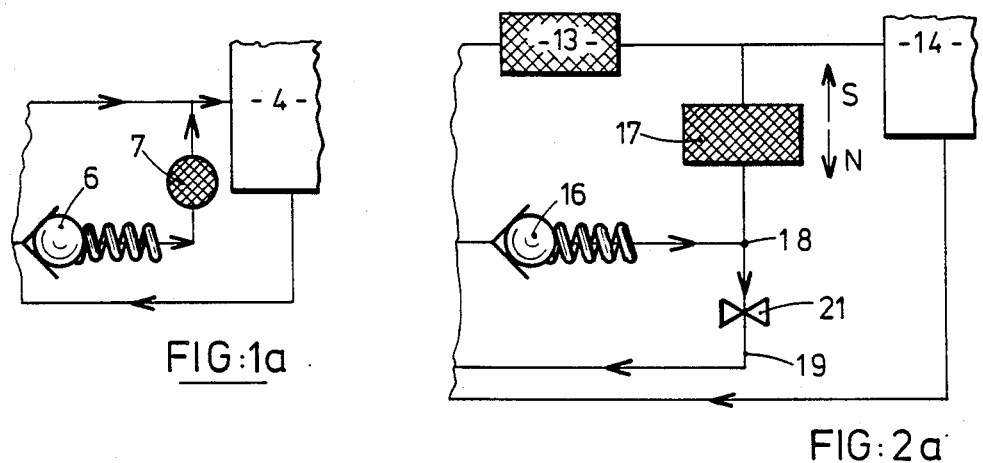
FIG:1a
FIG:2a
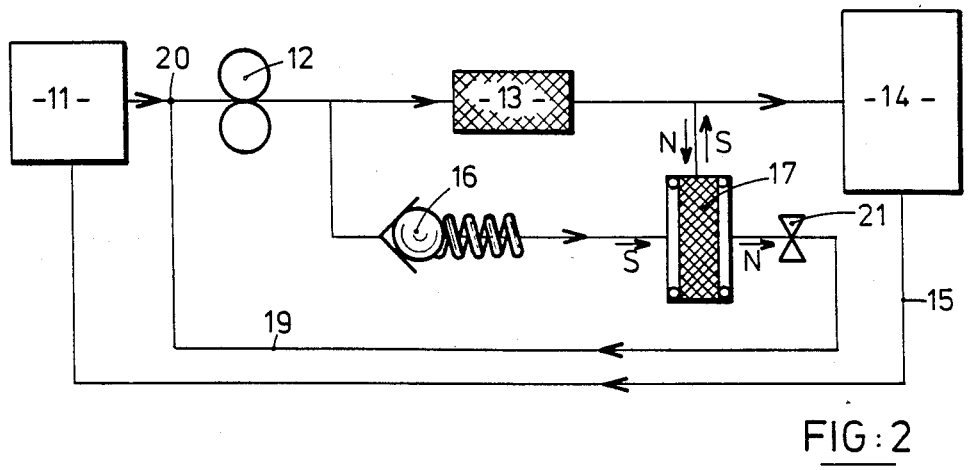
FIG:2

SELF CLEANING BY-PASS FILTRATION ARRANGEMENT

BACKGROUND OF THE INVENTION

1. Field of the Invention

The present invention relates to a filtration arrangement in a fluid feed system comprising a fluid reservoir, a supply pump, and user circuits supplied with fluid from said reservoir by said pump, and is particularly concerned with such a filtration arrangement for a lubrication circuit of a turbo-engine.

2. Summary of the Prior Art

Supplying a turbo-engine lubrication circuit with lubricating fluid is generally effected in the manner illustrated diagrammatically in FIG. 1 of the accompanying drawings. The lubricating fluid is drawn from a reservoir 1 by a pump 2, usually of the positive displacement type, and passes through a filter 3 before being distributed to the user circuits 4 of the turboengine. A circuit 5 for recovery and return of the fluid from the user circuits 4 to the reservoir 1 completes the installation.

Any interruption in the supply of lubricating fluid to the user circuits in such a system could have catastrophic consequences, especially in aeronautical applications. Consequently, a safety circuit, comprising a by-pass valve 6, is usually mounted in parallel with the filter 3. Thus, when the pressure drop across the filter 3, resulting from clogging caused by the collection of pollutant material from the lubricating fluid passing through the filter 3, exceeds a pre-set threshold, the by-pass valve 6 opens under the action of pressure so that the user circuits 4 continue to be supplied. With such a system, a choice has to be made between two possible alternatives.

In one case the filter arrangement may be completed by means of a relief filter 7 mounted in series with the by-pass valve 6 as shown in FIG. 1a, which means that the relief filter 7 is also subject to clogging whenever the main filter of the fluid supply circuit is by-passed. This arrangement also has other drawbacks, particularly in an aircraft engine, where the room available is extremely limited for incorporating the equipment and the need for accessibility to the two filters 3 and 7 can make the system a very costly arrangement. In addition, maintenance work takes longer and is more complicated because of the need to replace or clean the two filters 3 and 7, and failure to clean the filters leads back to the original risk of catastrophic interruption of lubrication.

Alternatively, in order to avoid these drawbacks, and particularly for essential reasons of safety, one may choose not to include a relief filter 7 in the by-pass supply circuit incorporating the by-pass valve 6. In this case, however, the user circuits 4 are supplied by a polluted lubricating fluid, which also has obvious drawbacks.

SUMMARY OF THE INVENTION

The object of the invention is to provide a filtration arrangement which overcomes the problem of maintaining a supply of fluid to the user circuits, while avoiding the drawbacks of the unsatisfactory solutions which have hitherto been used.

To this end, there is provided a filtration arrangement in a fluid feed system, particularly a lubrication circuit of a turbo-engine, comprising a main filter between the supply pump and the user circuits of said feed system, a by-pass circuit by-passing said main filter in parallel therewith, said by-pass circuit including a by-pass control valve and a relief filter in series with said valve, and a return circuit connected between said by-pass circuit and said feed system upstream of said supply pump, said return circuit including throttling means and being connected to said by-pass circuit at a position downstream of said by-pass valve such that, when said main filter is blocked and said by-pass valve is open, fluid flows to said user circuits through said relief filter while a portion of said fluid passing through said by-pass circuit is returned upstream of said upply pump via said return circuit, and, when said by-pass valve is closed and said main filter is operational, a portion of the fluid flowing through said main filter for supply to said user circuits is returned upstream of said supply pump through said return circuit after passing through said relief filter in a direction opposite to the flow therethrough when said by-pass valve is open, thereby effecting a counter-flow cleaning of said relief filter.

The filtration arrangement in accordance with the invention provides numerous advantages, particularly when compared with existing arrangements. For example, the user circuits are always supplied with clean and filtered fluid. Also, no permanent clogging takes place is the relief filter, which simplifies and facilitates maintenance since regular cleaning and checking of this filter becomes unnecessary. It thus follows that, in turbo-engines, the relief filter need not be readily accessible, which enables better use to be made of the available space and hence the overall size of the engine to be reduced.

Other features and advantages of the invention will become apparent from the following description, with reference to the drawings, of the preferred embodiments of the filtration arrangement in accordance with the invention.

BRIEF DESCRIPTION OF THE DRAWINGS

FIG. 1 shows a schematic diagram of a lubrication circuit comprising a filtration arrangement of a known type.

FIG. 1a is a scrap view of part of the circuit of FIG. 1 showing a known modification of the filtration arrangement thereof.

FIG. 2 shows a diagrammatic representation of a lubrication circuit similar to FIG. 1, but comprising one embodiment of the filtration arrangement in accordance with the invention.

FIG. 2a is a partial view of a lubrication circuit incorporating an alternative embodiment of the filtration arrangement in accordance with the invention.

DESCRIPTION OF THE PREFERRED EMBODIMENTS

FIG. 2 shows a turbo-engine lubrication circuit comprising a reservoir 11, a positive displacement pump 12, a main filter 13, user circuits indicated generally at 14, a recovery and return circuit 15, and a by-pass valve 16 in a by-pass circuit mounted in parallel with the main filter 13 and including a relief filter 17 in series with the by-pass valve 16. In accordance with the invention, the by-pass circuit is also connected by a return circuit 19 to a point 20 situated upstream of the pump 12, th circuit 19 including throttling means formed by a gauged constriction 21 of moderate cross-section, e.g. of the order of 2 mm. As shown in FIG. 2, the return circuit 19 may be connected directly to the relief filter 17 remote from the by-pass valve 16 and the connection to the circuit leading to the user circuits 14. Alternatively, as shown in FIG. 2a, said circuit 19 may be connected to the by-pass circuit at a point 18 situated between the by-pass valve 16 and the relief filter 17.

The lubrication of the filtration arrangement in the lubrication circuits illustrated in FIGS. 2 and 2a may be deduced directly from th description just given. In normal operation, the lubricating fluid taken from the reservoir 11 by the pump 12 is supplied through the main filter 13 to the user circuits 14 of the turbo-engine, a clean and filtered fluid thus being delivered in an adequate amount. If the main filter 13 becomes clogged during operation so that the head loss across the filter 13 exceeds a specific threshold, the pressure differential created across the by-pass valve 16 caused this valve to open so that the lubricating fluid is then delivered to the user circuits 14 through the by-pass circuit, the fluid accordingly being filtered by the relief filter 17. It will be noted that th fluid in this case passes through the relief filter 17 in the direction S from the valve 16 to the circuits 14. The clogging of the main filter 13 can be signalled by an alarm in a known manner to indicate that the next maintenance operation should include cleaning the main filter 13.

When normal operation resumes after the main filter has been cleaned, part of the lubricating fluid issuing clean and filtered from the main filter 13 for delivery to the user circuits 14 is diverted so that it flows through the relief filter 17 to the return circuit 19, hence passing through the throttling means 21 to the connection point 20 upstream of the pump 12. This fluid thus flows through the relief filter 17 in a direction N, which is counter to the direction of fluid flow S when the by-pass valve 16 is open. Accordingly, the impurities and deposits collected by the relief filter 17 during the previous by-pass operating phase are flushed out by the clean fluid diverted from the main filter 13 to the return circuit 19, thus ensuring automatic counterflow cleaning of the relief filter 17 in readiness for it to perform once again its relief filtering function when the main filter 13 next becomes clogged and the by-pass valve 16 opens.

All the components used in the construction of the lubrication circuits which have been described, including the filtration arrangements integrated therein, may be of a known type normally used for such circuits, the advantages afforded by the invention, particularly the self-cleaning of the relief filter, being due to the particular way in which the components are connected together.

I claim:

1. In a fluid feed system, particularly a lubrication circuit of a turbo-engine, comprising a fluid reservoir, a supply pump, and user circuits supplied with fluid from said reservoir by said pump, a filtration arrangement comprising a main filter between said pump and said user circuits, a by-pass circuit by-passing said main filter in parallel therewith, said by-pass circuit including a by-pass control valve and a relief filter in series with said valve, and a return circuit connected between said by-pass circuit and said feed system upstream of said supply pump, said return circuit including throttling means and being connected to said by-pass circuit at a position downstream of said by-pass valve such that, when said main filter is blocked and said by-pass valve is open, fluid flows to said user circuits through said relief filter while a portion of said fluid passing through said by-pass circuit is returned upstream of said supply pump via said return circuit, and, when said by-pass valve is closed and said main filter is operational, a portion of the fluid flowing through said main filter for supply to said user circuits is returned upstream of said supply pump through said return circuit after passing through said relief filter in a direction opposite to th flow therethrough when said by-pass valve is open, thereby effecting a counter-flow cleaning of said relief filter.

2. A filtration arrangement according to claim 1, wherein said return circuit is connected to said bypass circuit at a position between said by-pass valve and said relief filter.

3. A filtration arrangement according to claim 1, wherein said return circuit is connected to said relief filter so that fluid is received by said return circuit through said relief filter when said by-pass valve is open and when said by-pass is closed.

* * * * *

UNITED STATES PATENT AND TRADEMARK OFFICE
CERTIFICATE OF CORRECTION

PATENT NO. : 4,905,644

DATED : MARCH 6, 1990

INVENTOR(S) : DOMINIQUE Y.G. MASCLET

It is certified that error appears in the above-identified patent and that said Letters Patent is hereby corrected as shown below:

In column 1, line 20, change "turboengine" to --turbo-engine--.

In column 2, line 13, change "upply" to --supply--;

line 27, change "is" to --in--;

line 66, change "th" to --the--.

In column 3, line 8, change "lubrication" to --operation--;

line 10, change "th" to --the--;

line 18, change "caused" to --causes--;

line 22, change "th" to --the--.

In column 4, line 23, change "valveis" to --valve is--;

line 32, change "th" to --the--;

line 36, change "bypass" to --by-pass--.

Signed and Sealed this

Eleventh Day of June, 1991

*Attest:*

HARRY F. MANBECK, JR.

*Attesting Officer*　　*Commissioner of Patents and Trademarks*